(12) United States Patent
Zhang et al.

(10) Patent No.: US 6,366,067 B1
(45) Date of Patent: Apr. 2, 2002

(54) VOLTAGE REGULATOR FOR REDUCING EMI

(75) Inventors: Michael T. Zhang, Portland; Harry G. Skinner, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/607,484

(22) Filed: Jun. 30, 2000

(51) Int. Cl.[7] .................................................. G05F 1/40
(52) U.S. Cl. ........................................................ 323/282
(58) Field of Search ................................ 323/282, 283, 323/284

(56) References Cited

U.S. PATENT DOCUMENTS

| | | | |
|---|---|---|---|
| 3,828,203 A | | 8/1974 | Belson et al. |
| 3,851,262 A | | 11/1974 | Hohmann et al. |
| 4,190,882 A | * | 2/1980 | Chevalier et al. ............. 363/26 |
| 4,507,796 A | | 3/1985 | Stumfall |
| 5,568,044 A | * | 10/1996 | Bittner ......................... 323/272 |
| 5,747,976 A | * | 5/1998 | Wong et al. ................. 323/282 |
| 5,912,552 A | * | 6/1999 | Tateishi ....................... 323/285 |
| 6,040,668 A | * | 3/2000 | Huynh et al. ............... 318/471 |
| 6,240,123 B1 | | 5/2001 | Zhang et al. |

OTHER PUBLICATIONS

"Multi–Phase Pulse Width Modulated Voltage Regulator" Serial No. 09/594,010, filed Jun. 15, 2000.

* cited by examiner

Primary Examiner—Peter S. Wong
Assistant Examiner—Gary L. Laxton
(74) Attorney, Agent, or Firm—Mark V. Seeley

(57) ABSTRACT

An improved voltage regulator is disclosed, which includes a pulse width modulator for generating a switching signal at a modulated frequency. A drive circuit is coupled to the output of the pulse width modulator, and a switching transistor is coupled to the output of the drive circuit and to an input voltage. The switching transistor generates an output voltage.

4 Claims, 2 Drawing Sheets

VOLTAGE REGULATOR FOR REDUCING EMI

FIELD OF THE INVENTION

The present invention relates to voltage regulators and in particular to switching voltage regulators for DC to DC voltage regulation.

BACKGROUND OF THE INVENTION

Computer systems can emit electromagnetic radiation at various frequencies. Those emissions may cause undesirable electromagnetic interference ("EMI") with the circuitry of the computer system and other electronic equipment near the computer system. For that reason, the FCC has enacted certain Open Chassis EMI regulations that impose limits on the electromagnetic emissions that such systems generate. 47 CFR §15.109. These limits are specified in Table 1 below.

TABLE 1

| Field Strength Limits for Unintentional Radiators at a Distance of 3 Meters | |
| --- | --- |
| Frequency of Emission (MHz) | Field Strength (microvolts/meter) |
| 30–88 | 100 |
| 88–216 | 150 |
| 216–960 | 200 |
| >960 | 500 |

Currently, system designers are primarily concerned with the radiation produced when certain signals (to be transmitted between various components) are driven at certain periodic frequencies, and with the radiation generated by components that operate at high frequency, e.g., microprocessors. As the development of computer systems has advanced, however, other components are beginning to contribute electromagnetic emissions that make it increasingly difficult to pass these FCC regulations.

One class of components beginning to contribute to this problem comprises voltage regulators. To meet the increasing power delivery requirements of certain components (e.g., microprocessors), voltage regulator circuits must increase their frequency of operation—to ensure they will not require unacceptably large inductors and capacitors to perform their function. Such circuits may be required to operate at several hundred kHz to 1 MHz, or even higher. Such frequencies' harmonics may produce electromagnetic emissions that make it increasingly difficult to pass the FCC's Open Chassis EMI regulations for the 30–88 MHz range.

Making matters worse is that multi-phase voltage regulators are beginning to replace single-phase devices. Such multi-phase components operate at a frequency that is a multiple of the frequency at which signals are driven for each phase. For example, a four phase 1 MHz voltage regulator has an EMI signature like that of a device that operates at a 4 MHz fundamental frequency. EMI producing harmonics for such a device may easily reach the 30–88 MHz range. Although the emissions these components generate can be reduced by placing various types of Faraday cages (or other sealing/covering apparatus) over them, such devices add cost to the system, may occupy scarce motherboard space, and may impose challenging signal routing requirements. As a consequence, using such devices to address this issue is not a particularly attractive solution.

Accordingly, there is a need for an improved voltage regulator. There is a need for such a device that can operate at a high frequency without causing unacceptable EMI. There is also a need for such a device that can be integrated into standard system designs without requiring significant modification (e.g., without requiring placement of various types of EMI shielding components over the voltage regulator). The voltage regulator of the present invention provides such a device.

DETAILED DESCRIPTION OF THE PRESENT INVENTION

A voltage regulator is described. That device includes a pulse width modulator for generating a switching signal at a modulated frequency. A drive circuit is coupled to the output of the pulse width modulator, and a switching transistor is coupled to both the output of the drive circuit and to an input voltage. The switching transistor generates an output voltage.

In the following description, numerous details are set forth to provide a thorough understanding of the present invention. However, it will be apparent to those skilled in the art that the invention may be practiced in many ways other than those expressly described here. The invention is thus not limited by the specific details disclosed below.

Figure 1:
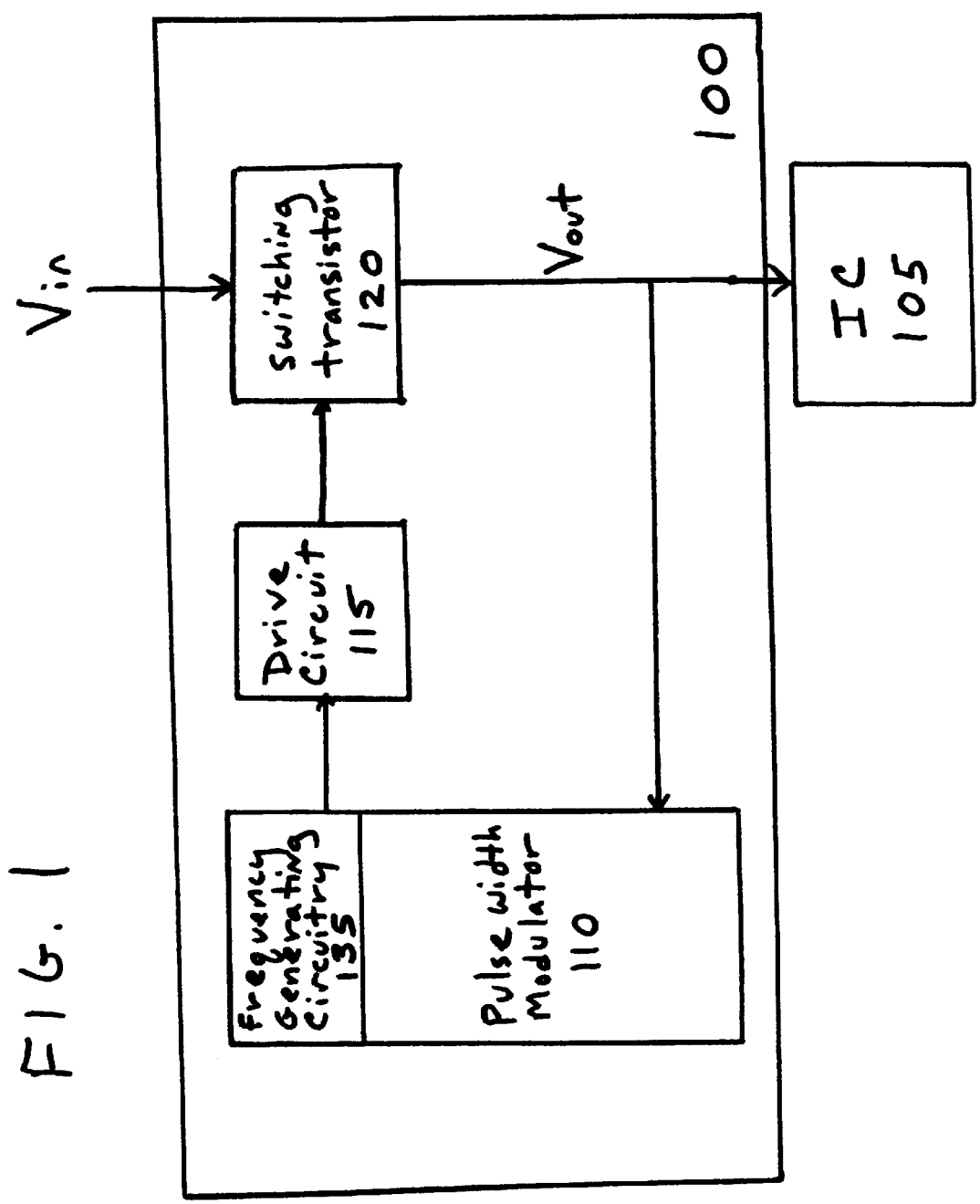
FIG. 1 is a block diagram representing a first embodiment of the voltage regulator of the present invention.

FIG. 1 illustrates a voltage regulator according to one embodiment of the present invention. Voltage regulator 100 comprises pulse width modulator 110, drive circuit 115, and switching transistor 120. In this embodiment, switching transistor 120 provides a DC output voltage, $V_{out}$, to integrated circuit 105. The DC output voltage, $V_{out}$, is fed back to pulse width modulator 110. Pulse width modulator 110 provides a drive signal that turns switching transistor 120 on and off in response to the sensed value of $V_{out}$.

The pulse width modulator of the present invention outputs the drive signal at a modulated frequency, while modulating the pulse width of that signal to vary the amount of time that switching transistor 120 is switched on. When turned on, switching transistor 120 couples the DC input voltage, $V_{in}$, to the output voltage, $V_{out}$. (The term "coupled," when used in this application, does not mean "directly connected." One element may be coupled to another via one or more intermediate components. For example, although switching transistor 120 "couples" $V_{in}$ to $V_{out}$, those skilled in the art will recognize that there typically is an L-C filter positioned between $V_{in}$ and $V_{out}$ to prevent a short.)

The DC output voltage, $V_{out}$, is a function of the duty cycle of pulse width modulator 110 and the DC input voltage. As is well known in the art, any desired output voltage lower than the input voltage can be obtained by varying the time during which switching transistor 120 is switched on. For example, if pulse width modulator 110 causes switching transistor 120 to be on fifty percent of the time, the DC output voltage supplied to integrated circuit 105 will be approximately equal to fifty percent of the input voltage. Because that output voltage is controlled by the duty cycle, independent of the switching frequency, the frequency can be modulated without affecting the voltage conversion.

In this embodiment, pulse width modulator 110 includes frequency generating circuitry 135, which outputs a modulated frequency. Signals generated at that modulated frequency are transmitted to drive circuit 115, which provides the power required to turn switching transistor 120 on and off. By modulating the output, frequency generating circuitry 135 spreads the energy in the corresponding harmonics over a relatively wide band. This reduces the electromagnetic emission peaks at any given harmonic frequency.

Frequency generating circuitry 135 preferably modulates the relatively high frequency of the signals transmitted to drive circuit 115 at a relatively low frequency and amplitude. The modulation frequency may, for example, be between about 9 kHz and about 50 kHz. In a preferred embodiment, the spread for the modulated frequency may reach 5% of the nominal frequency, or higher.

High frequency timing circuits may have to limit spread to about 0.6% of the nominal frequency to minimize the impact frequency modulation may have on timing requirements. Unlike those timing circuits, because such restrictions do not apply to voltage regulators, they may apply a higher percentage spread—as long as that spread does not negatively affect regulator stability or the operation/design of the device's magnetic components. Because voltage regulators can handle higher spreads, EMI reduction can be significant (e.g., greater than 6 dB). (Note, for example, that 5% spreads for 30 MHz and 60 MHz equal spreads of 1.5 MHz and 3.0 MHz, respectively.)

Pulse width modulator 110, drive circuit 115 and switching transistor 120 may comprise standard circuits used to make conventional voltage regulators. To generate a modulated frequency, frequency generating circuitry 135 may comprise various types of circuits for performing a spread spectrum clocking ("SSC") function. To perform such a function, an SSC generator might receive a signal from a reference generator, which reflects a nominal fundamental frequency. The SSC generator may use that nominal frequency to generate a modulated frequency, i.e., a time-varying frequency that deviates slightly from the nominal frequency. Signals to be transmitted to drive circuit 115 are then transmitted at that modulated frequency. Analog or digital circuits (or both) may be used to create such an SSC generator. When digital, the SSC function may be performed using circuits like those that clock devices (e.g., those mounted to motherboards) conventionally use to modulate clock signals.

Alternatively, that function may be performed by cycling through a look up table that specifies incrementally varying frequencies (e.g., a set of frequencies that incrementally increase from a frequency that is about 5% below a nominal frequency, up to the nominal frequency, then back down to the lower frequency). Over a given period, sequential accesses to such a look up table can cause the frequency of the signal transmitted to drive circuit 115 to modulate over a selected spread of frequencies. If frequency generating circuitry 135 uses an RC network to set the frequency at which signals are transmitted to drive circuit 115, the frequency may be modulated by incrementally varying the resistance and/or capacitance of such a network, using techniques well known to those skilled in the art.

Figure 2:
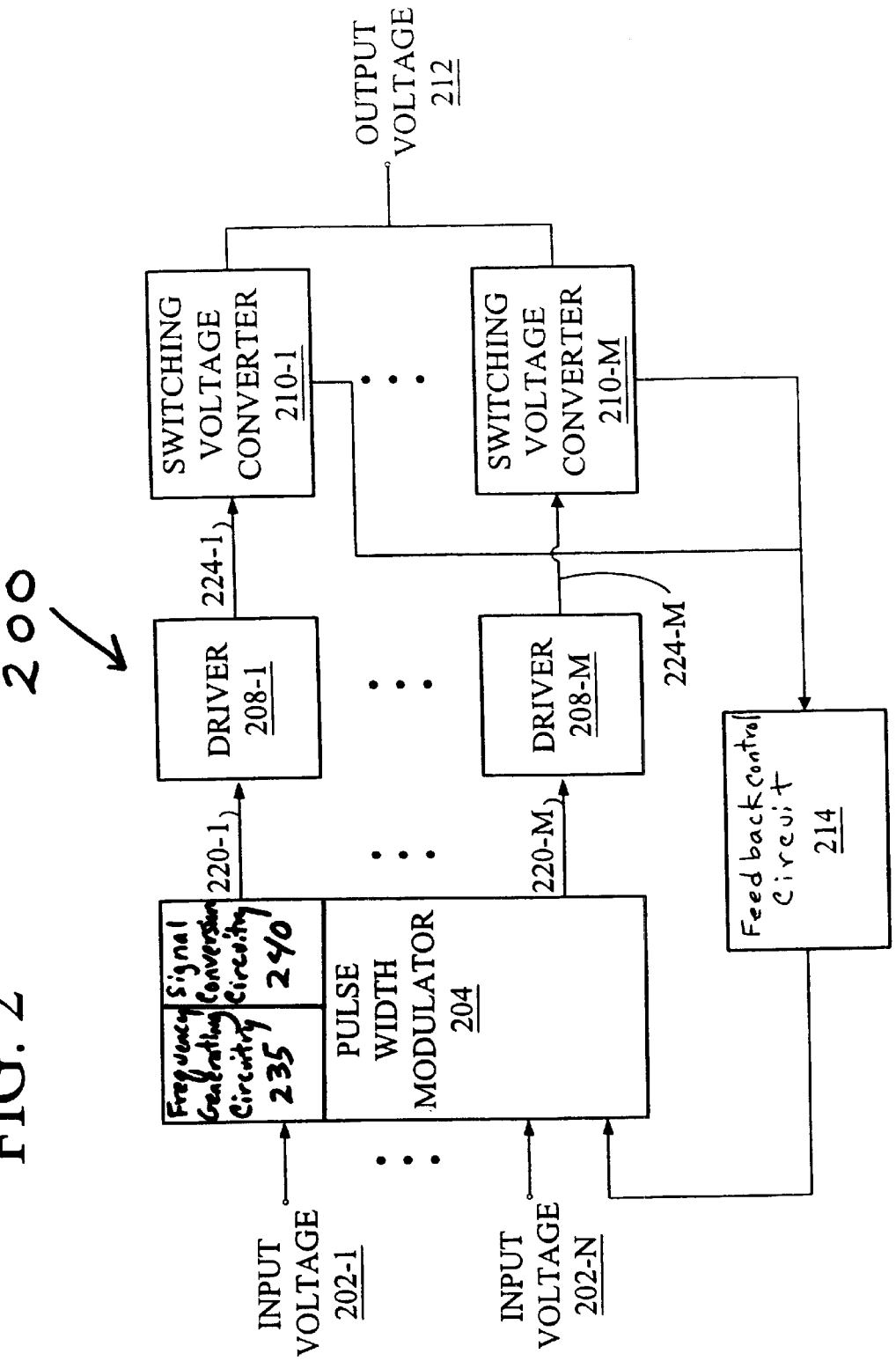
FIG. 2 is a block diagram representing a second embodiment of the voltage regulator of the present invention.

FIG. 2 illustrates a second embodiment of the present invention in which voltage regulator 200 comprises a multi-phase pulse width modulator. Regulator 200 includes a pulse width modulator 204, a number of drivers 208 equal to the number of phases (shown as 208-1 through 208-M), a similar number of switching voltage converters 210 (shown as 210-1 through 210-M), and a feedback control circuit 214. The input DC voltages 202 (shown as 202-1 through 202-N) from a power supply (not shown) are input to regulator 200. Regulator 200 converts input voltages 202 to an output voltage 212.

Pulse width modulator 204 generates a number of switching signals 220 equal to the number of phases M (shown as 220-1 to 220-M). The switching signals may be square-wave in shape, and are out of phase from one another. For example, with a four-phase regulator, pulse width modulator 204 generates four switching signals, where the signals from one phase to the next are separated by 90°. For each of the M phases, the switching signal power is boosted by driver 208 (the boosted signals are depicted by lines 224-1 through 224-M). Driver 208 provides the power necessary to drive switching voltage converter 210 at a high frequency.

According to an example embodiment of the present invention, switching voltage converter 210 represents a pulse width modulated ("PWM") series-switch stepdown converter. PWM converters can be used to obtain a lower voltage from a higher one by using a low-impedance transistor switch that is made to open and close periodically between input and output. The transistor switch is driven by the switching voltage generated by pulse width modulator 204.

Output voltage 212 is formed by combining the outputs of the switching voltage converters 210. In this embodiment, feedback control circuit 214 provides the feedback necessary for voltage regulation. The particular implementation of feedback control circuit 214 can vary according to whether a voltage mode topology or a current mode topology is used.

Voltage regulator 200 may comprise a four phase regulator that operates at a frequency of about 1 MHz, or higher. Pulse width modulator 204, drivers 208 and switching voltage converters 210 may comprise standard circuits used to make conventional multi-phase pulse width modulated voltage regulators. To generate a modulated frequency, pulse width modulator 204 includes frequency generating circuitry 235 and signal conversion circuitry 240. Frequency generating circuitry 235 generates a first switching signal at a modulated frequency. Signal conversion circuitry 240 receives that first switching signal and converts it into a plurality of switching signals, e.g., signals 220-1 through 220-M, which are transmitted to drivers 208. As in the FIG. 1 embodiment, frequency generating circuitry 235 may comprise various types of circuits for performing a spread spectrum clocking ("SSC") function. Such SSC circuitry may be implemented digitally or in analog.

The voltage regulators of FIGS. 1 and 2 enable the desired duty cycle to be maintained with only the pulse train varying with time. That is, the pulse width may continue to vary in response to output voltage feedback, in the conventional manner, while the frequency at which those pulses are driven is slightly varied over a selected period.

An improved voltage regulator has been described. The frequency generating circuitry included in it is particularly useful for multi-phase pulse width modulated voltage regulators, which may have EMI signatures several times larger than those of single phase devices. By adding to a voltage regulator frequency generating circuitry that is capable of generating switching signals at a modulating frequency, the resulting voltage regulator will produce reduced electromagnetic emissions without requiring placement of costly and cumbersome shielding/covering mechanisms over the regulator.

Additional components that may be included in the illustrated voltage regulators have been omitted as they are not useful to describe aspects of the present invention. Although the foregoing description has specified a voltage regulator that includes certain features, those skilled in the art will appreciate that many modifications and substitutions may be made. Accordingly, it is intended that all such modifications, alterations, substitutions and additions be considered to fall within the spirit and scope of the invention as defined by the appended claims.

What is claimed is:

1. A computer system comprising:

a microprocessor, and a voltage regulator for delivering power to the microprocessor, the voltage regulator comprising:

a pulse width modulator that includes frequency generating circuitry for generating a first switching signal at a modulated frequency, such that the frequency of that signal is modulated over a given period and over a selected spread of frequencies that deviate from a nominal frequency, the pulse width modulator also modulating the pulse width of that signal to vary the amount of time that a plurality of switching transistors are switched on, enabling a plurality of switching transistors to maintain a desired duty cycle despite the pulse width modulator generating the first switching signal at a modulated frequency, and signal conversion circuitry for converting the first switching signal into a plurality of switching signals;

a plurality of drivers, each coupled to receive one of the plurality of switching signals; and a plurality of switching voltage converters, each coupled to receive an output from one of the drivers and an input voltage, wherein the outputs of the switching voltage converters are combined to form an output voltage.

2. The computer system of claim 1 wherein the plurality of drivers includes at least four drivers.

3. The computer system of claim 2 wherein the first switching signal is generated with a nominal frequency of at least 1 MHz.

4. The computer system of claim 3 wherein the selected spread of frequencies is repeated at between about 9 kHz and about 50 kHz and wherein the spread for the modulated frequency exceeds 5% of the nominal frequency.

* * * * *